United States Patent
Qiu et al.

(10) Patent No.: US 11,846,727 B2
(45) Date of Patent: Dec. 19, 2023

(54) SYSTEM AND METHOD FOR EMULATING ECHO SIGNALS FOR A LIDAR SENSOR

(71) Applicant: Keysight Technologies, Inc., Santa Rosa, CA (US)

(72) Inventors: Li Qiu, Beijing (CN); Lee A. Barford, San Jose, CA (US); Zi-Quan Bai, Beijing (CN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 103 days.

(21) Appl. No.: 17/539,965

(22) Filed: Dec. 1, 2021

(65) Prior Publication Data

US 2022/0206117 A1    Jun. 30, 2022

(30) Foreign Application Priority Data

Dec. 31, 2020   (CN) .......................... 202011641255.8

(51) Int. Cl.
  *G01S 17/48*   (2006.01)
  *G01S 17/894*   (2020.01)
  (Continued)

(52) U.S. Cl.
  CPC .......... *G01S 7/4808* (2013.01); *B60R 16/023* (2013.01); *G01S 7/51* (2013.01);
  (Continued)

(58) Field of Classification Search
  CPC .. G06T 7/70; G06T 7/20; G06T 15/06; G06T 17/00; G01S 17/003; G01S 17/894;
  (Continued)

(56) References Cited

U.S. PATENT DOCUMENTS 11,592,563 B2 *  2/2023  Roos .................. G01S 7/4817
2019/0361101 A1  11/2019  Paitek
(Continued)

OTHER PUBLICATIONS

Tobias Renzler et al., "Increased Accuracy for Fast Moving LiDARS: Correction of Distorted Point Clouds," 2020 IEEE International Instrumentation and Measurement Technology Conference (I2MTC), Dubrovnik, Croatia, 2020, pp. 1-6.
(Continued)

*Primary Examiner* — Todd Buttram

(57) ABSTRACT

A system and method are provided for emulating echo signals in response to a LiDAR signal. The method includes updating a current position of a moving emulated target according to a 3D simulation scene at a current frame, the simulation scene including a dynamic model of the target; estimating a next position of the target at a next frame of the simulation scene by updating motion transforms for the dynamic model using motion keys; performing ray tracing by launching rays in parallel, assigning different pulse times to the rays to simulate timing of corresponding light pulses of the LiDAR signal, estimating positions of the target at the different pulse times using interpolation, and identifying intersections of the rays with the estimated positions of as positions of hits of the rays; transmitting emulated echo signals to the LiDAR sensor indicating the positions of the hits; and updating the simulation scene.

20 Claims, 5 Drawing Sheets

(51) Int. Cl.
*G01S 17/93* (2020.01)
*G01S 17/42* (2006.01)
*G01S 7/51* (2006.01)
*B60R 16/023* (2006.01)
*G06T 15/06* (2011.01)
*G06T 17/00* (2006.01)
*G06T 7/20* (2017.01)
*G06T 7/70* (2017.01)
*G01S 7/48* (2006.01)

(52) U.S. Cl.
CPC ............ *G01S 17/42* (2013.01); *G01S 17/894* (2020.01); *G01S 17/93* (2013.01); *G06T 7/20* (2013.01); *G06T 7/70* (2017.01); *G06T 15/06* (2013.01); *G06T 17/00* (2013.01)

(58) Field of Classification Search
CPC . G01S 7/51; G01S 17/42; G01S 17/93; B60R 16/023
See application file for complete search history.

(56) References Cited

U.S. PATENT DOCUMENTS

| | | |
|---|---|---|
| 2020/0160598 A1 | 5/2020 | Manivasagam et al. |
| 2020/0301799 A1 | 9/2020 | Manivasagam et al. |
| 2022/0206117 A1* | 6/2022 | Qiu .......................... G06T 7/20 |

OTHER PUBLICATIONS

Niklas Peinecke et al., "Lidar simulation using graphics hardware acceleration," 2008 IEEE/AIAA 27th Digital Avionics Systems Conference, St. Paul, MN, 2008, pp. 1-8.
Jin Fang et al., "Augmented LiDAR Simulator for Autonomous Driving," IEEE Robotics and Automation Letters, vol. 5, No. 2, Apr. 2020, pp. 1-8.
English translation of CN110532582A, 11 pgs.
Sivabalan Manivasagam et al., "LiDARsim: Realistic LiDAR Simulation by Leveraging the RealWorld", 2020 IEEE/CVF Conference on Computer Vision and Pattern Recognition, 2020, pp. 11167-11176.

* cited by examiner

SYSTEM AND METHOD FOR EMULATING ECHO SIGNALS FOR A LIDAR SENSOR

CROSS REFERENCE TO RELATED APPLICATION

The present application claims priority under 35 U.S.C. § 119(e) to Chinese Patent Application No. 202011641255.8, filed on Dec. 31, 2020. The entire disclosure of Chinese Patent Application No. 202011641255.8 is hereby specifically incorporated by reference in its entirety.

BACKGROUND

Advanced driver-assistance systems (ADASs) and autonomous driving systems for vehicles rely on detection and ranging systems that use detection and ranging electromagnetic signals, including millimeter wave radio detection and ranging (Radar) signals and light detection and ranging (LiDAR) signals. The detection and ranging electromagnetic signals are used to warn of forward collisions and backward collisions, to implement adaptive cruise control and autonomous parking, for example, and ultimately to perform autonomous driving on streets and highways. The detection and ranging electromagnetic signals are intended to be used under various types of weather conditions.

Conventional ADASs and autonomous driving systems typically have multiple transmitters and receivers on the vehicle. Actual driving environments in which the radar systems may be deployed can vary greatly, and many such driving environments may be complex. For example, actual driving environments may contain numerous objects, some of which may objects encountered in actual driving environments have complicated reflection, diffraction and multi-time reflection characteristics that affect echo signals responsive to the detection and ranging signals. The immediate consequences of incorrectly sensing and/or interpreting echo signals may be that false warnings or improper reactions are triggered or warnings or reactions that should be triggered are not, which in turn can lead to collisions.

LiDAR, in particular, has the potential to become the main sensor for automotive autonomous driving systems due to its ability to provide accurate and long-range three-dimensional (3D) information for localization and mapping applications as well as for object detection collision avoidance. LiDAR is a scanning process that rapidly measures the distance to objects at a number of different directions from the sensor. To cover the entire field of view, repetitive measurements are performed, and the results from different angles and time instances are stored as point cloud. Generally, LiDAR systems operate by generating light pulses from a light (laser) source fixed within a sensor. The light pulses illuminate a spinning mirror, for example, that redirects the light in different azimuth angles from the sensor. One type of LiDAR is known as a time-of-flight (TOF) LiDAR, which includes multiple transmitters and receivers adapted to transmit and receive laser light to/from the surroundings to exact certain measurements, such as distance of different objects from the LiDAR. The time delay of the round-trip pulse received at the LiDAR receiver is used to determine the distance from the object, which may be referred to as a target.

In automated driving applications, the LiDAR sensor is mounted on a moving object (ego vehicle), so the LiDAR sensor moves during the measurement. This movement of the vehicle during one 360 degree spin of the mirror causes single measurement points to have different reference locations in 3D space. The movement during measurement also induces vehicle velocity-dependent distortions in the distances measured by the LiDAR. Accurate emulation of a LiDAR system therefore must include compensation for these distortions.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
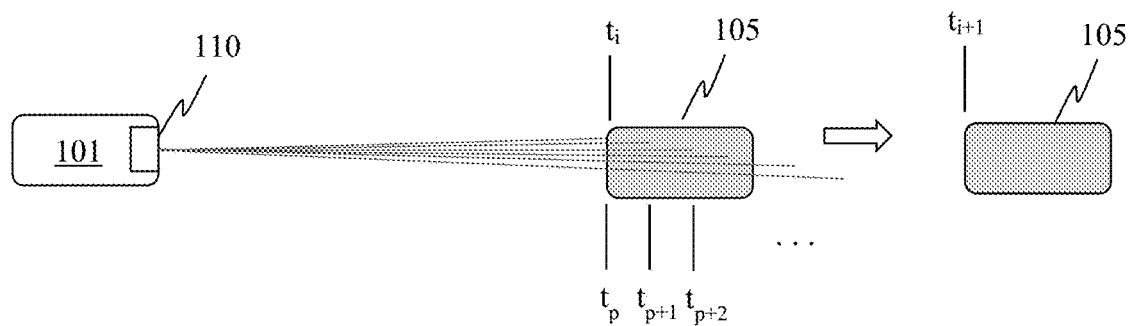
FIG. 1A is a simplified schematic diagrams showing a LiDAR sensor on a vehicle under test sending LiDAR signals toward an emulated target moving away from the LiDAR sensor, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to a representative embodiment, a method is provided for emulating echo signals reflected from targets in response to a LiDAR signal transmitted by a LiDAR sensor on a vehicle under test, the emulated echo signals including distortion from movement of the targets and/or the LiDAR sensor. The method includes updating a current position of at least one moving emulated target according to a 3D simulation scene at a current frame, the 3D simulation scene including at least one dynamic model of the at least one moving emulated target; estimating a next position of the at least one moving emulated target at a next frame of the 3D simulation scene by updating motion transforms for the at least one dynamic model using a plurality of motion keys; performing ray tracing, which includes launching rays in parallel, assigning different pulse times to the rays to respectively simulate timing of corresponding light pulses of the LiDAR signal, estimating interim positions of the at least one moving emulated target at the different pulse times using interpolation, and identifying intersections of the rays with the at least one moving emulated target at the estimated interim positions as positions of hits of the rays; transmitting emulated echo signals to the LiDAR sensor indicating the positions of the hits; and updating the 3D simulation scene at the next frame to update a new current position of the at least one moving emulated target.

According to another representative embodiment, a system is provided for emulating echo signals reflected from targets in response to a LiDAR signal transmitted by a LiDAR sensor on a vehicle under test, the emulated echo signals including distortion from movement of the targets and/or the LiDAR sensor. The system includes an optical front end, a LiDAR target simulator, a processor and a non-transitory memory. The optical front end includes an optical collection lens configured to receive the LiDAR signal transmitted by the LiDAR sensor and an optical transmitter lens configured to transmit emulated echo signals in response to the LiDAR signal reflecting from a moving emulated target. The LiDAR target simulator is configured to simulate at least distance of the moving emulated target from the LiDAR sensor. The memory stores instructions that, when executed by the processor, cause the processor to update a current position of the moving emulated target according to a 3D simulation scene at a current frame, the 3D simulation scene including at least one dynamic model of the moving emulated target; extrapolate a next position of the moving emulated target at a next frame of the 3D simulation scene from the current position; interpolate interim positions of the moving emulated target between the current position and the extrapolated next position at times corresponding to light pulses of the LiDAR signal; and estimate intersections of the light pulses of the LiDAR signal and the moving emulated target at the interpolated interim positions. The LiDAR target simulator provides echo signals simulating distances of the moving emulated target at each of the estimated intersections, which are transmitted to the LiDAR sensor via the optical transmitter lens.

Generally, a LiDAR emulation system is provided for emulating echo signals reflected from one or more emulated targets in response to a LiDAR signal transmitted by a LiDAR sensor mounted on a vehicle under test, for example, in order to accurately emulate the physical world to the LiDAR sensor. The emulation presents driving scenarios to the LiDAR sensor, as well as other computers of the vehicle under test that depend on the LiDAR sensor's measurements, e.g., for testing, debugging and/or certifying various electronics and associated firmware and software without having to actually drive the vehicle under test. This saves money, reduces test time, and allows scenarios to be tested that would pose unacceptable danger to persons or property if done in the real world. Accurate emulation of the LiDAR responses includes emulating the velocity-dependent distortions that generally result from movement of the emulated targets. That is, the emulation system adjusts timing of return pulses (echo signals) to the LiDAR sensor to accurately emulate these distortions in real time.

Generally, according to representative embodiments, the LiDAR emulation system incorporates ray tracing implemented on a graphical processor unit (GPU) for real-time simulation of physical behavior of the LiDAR signal (laser beam). The advent of consumer GPUs with dedicated ray tracing hardware components enables ray tracing workloads in real-time even for complex driving scenarios. The real-time ray tracing processes a large number of rays in parallel, and therefore sees all of the rays at the same time. However, during a full revolution of the LiDAR sensor, light pulses are actually emitted at different times. A LiDAR sensor is able to fire rapid light pulses at rates up to hundreds of thousands per second. Such high pulse rates are beyond the capability of consumer GPUs.

The embodiments described herein provide cost-effective means for simulating the LiDAR light pulses in real-time, which are easily integrated into an autonomous drive simulator and hardware-in-the-loop scenario emulation with minimum simulation latency and maximum performance. Standard ray tracing application program interfaces (APIs) may be incorporated as long as they support ray traced motion blur, directly or indirectly. "Motion blur" is a photographic effect according to which a moving object is visible to different areas of a sensor over time. Accordingly, the LiDAR emulation system accurately simulates vehicle velocity-dependent distortions of LiDAR measurements in real-time, simulates LiDAR signals at a pulse level, and runs in real-time with low loop delay. In addition, the LiDAR emulation system is cost-effective as it only requires a consumer GPU, and can be easily implemented or integrated into existing autonomous driving simulators.

Figure 1B:
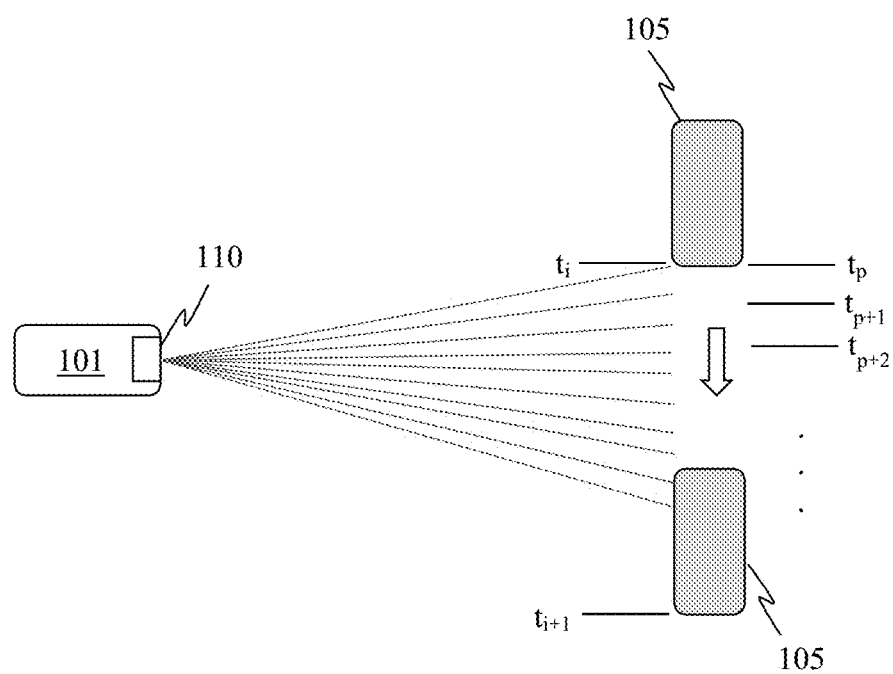
FIG. 1B is a simplified schematic diagrams showing a LiDAR sensor on a vehicle under test sending LiDAR signals toward an emulated target moving perpendicular to the LiDAR sensor, according to a representative embodiment.

FIGS. 1A and 1B are simplified schematic diagrams showing a LiDAR sensor on a vehicle under test sending LiDAR signals, according to a representative embodiment.

Referring to FIG. 1A, a vehicle under test 101 includes a LiDAR sensor 110. The LiDAR sensor 110 generates light (laser) pulses that reflect from a spinning mirror in different azimuth directions during one 360 degree rotation (scan) of the spinning mirror, which may be rotating at about 1 to 100 times per second, for example. In the depicted example, the LiDAR sensor 110 scans in a clockwise direction, for purposes of illustration. Also, the vehicle under test 101 is assumed to be stationary.

Meanwhile, a moving emulated target 105, which may be another vehicle on the road in front of the vehicle under test 101, is moving way from the front of the vehicle under test 101 at a constant velocity of 100 m/s, for example. The moving emulated target 105 is provided by a scene simulator in accordance with a previously determined and stored 3D simulation scene. The 3D simulation scene may include multiple dynamic targets, such as the moving emulated target 105, provided by corresponding dynamic models (data structures), as well as multiple stationary targets provided by corresponding stationary models. Examples of dynamic targets include moving vehicles, pedestrians and animals, and examples of stationary targets include traffic signs, telephone poles and debris in the roadway. Notably, in real life, the relative motion between a LiDAR sensor and a target causes distortion of the LiDAR signal used for tracking the moving target, e.g., caused by measurements being assigned to the last reference frame of the LiDAR signal even though the relative positions of the LiDAR sensor and the target change for each measurement. This distortion is reproduced, according to the representative embodiments herein, in order to accurately emulate the moving target.

Generally, echo signals from the moving emulated target 105 are emulated using a GPU running a standard ray tracing API configured to launch rays corresponding to different light pulses of the LiDAR sensor 110, and to generate emulated echo signals from the moving emulated target 105 at various positions where the light pulses are predicted to intersect the moving emulated target 105. However, the ray tracing API launches the rays simultaneously, even though the light pulses being simulated by the rays are emitted at different pulse times. To compensate for this, future positions of the moving emulated target 105 are calculated to correspond to the timing of when the light pulses would actually be emitted.

Therefore, as shown in FIG. 1A, the current position of the moving emulated target 105 is provided by the 3D simulation scene in a current frame at time instance $t_i$, where the position of the moving emulated target 105 is updated at a predetermined frame rate. Based on motion data of the 3D simulation scene, the next position of the moving emulated target 105 at time instance $t_{i+1}$ of the next frame of the 3D simulation scene is extrapolated from the current position of the emulated target 105 based on the constant velocity of the moving emulated target 105. In addition, the estimated interim positions of the moving emulated target 105 at pulse times $t_p$, $t_{p+1}$, $t_{p+2}$ ... of the LiDAR signal are calculated by interpolating between the current position of the moving emulated target 105 at the time instance $t_i$ and the next position of the moving emulated target 105 at the time instance $t_{i+1}$. Once these estimated interim positions are determined, the API is able to calculate where the rays corresponding to the different light pulses of the LiDAR sensor 110 would intersect the moving emulated target 105, if at all.

Motion blur associated with the emulated echo signals is also provided when performing the interpolation, thereby more accurately emulating real world reflections of the LiDAR signals. The API may include motion blur functionality, or the motion blur functionality may be provided by the LiDAR test system itself. Generally, an acceleration structure encloses the sweep of the moving emulated target 105 during one LiDAR scan, so that the ray will intersect the volume extended from the current time to the next time of the sweeps, or from the beginning to the end of one LiDAR scan. At this point, the ray traversal process finds the object at different positions the ray intersects. When calculating the exact intersection, the position of the moving emulated target is interpolated by pulse time and then the exact intersection can be found by math/built-in API functions.

Referring to FIG. 1B, the vehicle under test 101 is again assumed to be stationary, while the LiDAR sensor 110 scans in a clockwise direction, for purposes of illustration. However, the moving emulated target 105, which may be another vehicle, is travelling perpendicular to the path of the vehicle under test 101 at a constant velocity of 100 m/s, for example. The emulated echo signal from the moving emulated target 105 is determined in the same manner discussed above. That is, the current position of the moving emulated target 105 is provided by the 3D simulation scene in the current frame at time instance $t_i$, the next position of the moving emulated target 105 in the next frame at time instance $t_{i+1}$ is estimated by extrapolation, and the interim positions of the moving emulated target 105 between the current frame and the next frame at pulse times $t_p$, $t_{p+1}$, $t_{p+2}$ ... are estimated by interpolation. Once these estimated positions are determined, the GPU calculates where the rays corresponding to the different light pulses of the LiDAR sensor 110 would intersect the moving emulated target 105, if at all.

Figure 2:
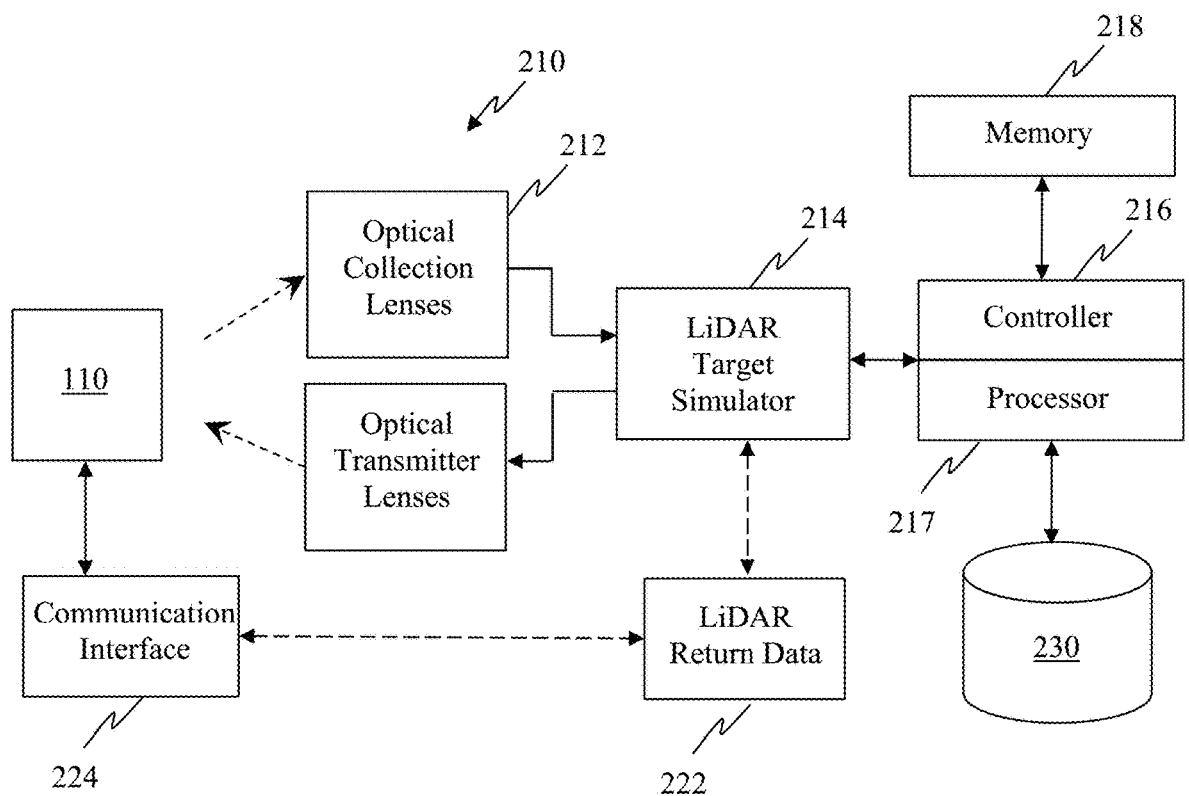
FIG. 2 is a simplified block diagram showing a LiDAR test system for emulating echo signals for a LiDAR sensor, according to a representative embodiment.

FIG. 2 is a simplified block diagram showing a system for emulating echo signals for a LiDAR sensor (device under test (DUT)), according to a representative embodiment. As will be appreciated by one of ordinary skill in the art having the benefit of the present disclosure, one likely LiDAR sensor is automobile LiDAR used in various capacities in current and emerging automobile ADAS and autonomous driving applications. However, it is emphasized that the presently described echo signal emulation system is not limited to automobile LiDAR sensors, and can be applied to other types of vehicles that could employ a vehicular LiDAR, including trucks, busses, motorcycles, bicycles, motorized bicycles (e.g., scooters), and aircraft, for example.

Referring to FIG. 2, LiDAR test system 200 is arranged to test LiDAR sensor 110. The LiDAR sensor 110 may include a light source, such as a laser source, that emits light pulses at a predetermined light pulse rate. As mentioned above, the LiDAR sensor 110 includes a spinning mirror that directs the light pulses emitted by the light source in different azimuth directions from the LiDAR sensor 110, covering an angular range of about 360 degrees relative to some reference position, e.g., direction of travel of the vehicle under test 101. Of course, the LiDAR sensor 110 may be configured to emit light pulses in different azimuth directions using techniques other than the spinning mirror, as would be apparent to one skilled in the art. Generally, the LiDAR sensor 110 includes transmitters for transmitting the light pulses and receivers paired with the transmitters for receiving the return (echo) signals from targets. In this way, simulated measurements over a desired angular range may be performed using TOF measurements.

The system 200 incudes an optical front end 210, a LiDAR target simulator 214 and a controller 216. The optical front end 210 includes optical collection lenses 212 and optical transmitter lenses 220. The optical collection lenses 212 adapted to receive light incident from the LiDAR sensor 110 and to transmit the light (e.g., by optical fibers) to the LiDAR target simulator 214. The LiDAR target simulator 214 is adapted to simulate the distance, or the reflectivity, and/or the shape of a target being emulated by the system 200 (not shown in FIG. 2). As described more fully below, the LiDAR target simulator 214 may include an optical simulator, or a combination of optical and electrical (i.e., a hybrid) simulator.

The system 200 also includes a controller 216 that is coupled to a memory 218. The controller 216 includes a processor 217 and is adapted to support a test sequence of light pulses of a LiDAR signals (e.g., channels) from the LiDAR sensor 110, and provide measurements (e.g., distance, reflectivity and shape) of a target being simulated. The target simulation by the LiDAR target simulator 214 is performed according to a predetermined 3D simulation scene, which is stored in database 230, for example, and retrieved by the controller 216 and/or the processor 217, which controls implementation by the LiDAR target simulator 214.

The processor 217, which is tangible and non-transitory, is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 217 (and other processors) of the present teachings is an article of manufacture and/or a machine component. The processor 217 for the controller 216 is configured to execute software instructions stored in the memory 218 to perform functions as described in the various embodiments herein. The processor 217 may be a general-purpose processor or may be part of an application specific integrated circuit (ASIC). The processor 217 may also be (or include) a microprocessor, a microcomputer, a processor chip, a controller, a microcontroller, a digital signal processor (DSP), a state machine, or a programmable logic device. The processor 217 may also be (or include) a logical circuit, including a programmable gate array (PGA) such as a field programmable gate array (FPGA), or another type of circuit that includes discrete gate and/or transistor logic. The processor 217 may be (or include) a central processing unit (CPU), a graphics processing unit (GPU), or both. Additionally, the processor 217 may comprise multiple processors, parallel processors, or both. Multiple processors may be included in, or coupled to, a single device or multiple devices.

The memory 218 may comprise a main memory or a static memory, or both, where the memories may communicate with each other via a bus (not shown). The memory 218 (and the database 230) described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 218 of the present teachings is an article of manufacture and/or machine component. The memory 218 (and other memories described herein) includes one or more computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known to one of ordinary skill in the art. Memories of the present teachings may be volatile or non-volatile, secure and/or encrypted, unsecure and/or unencrypted. The controller 216, the processor 217 and the memory 218 may be housed within or linked to a workstation such as a computer or another assembly of one or more computing devices, a display/monitor, and one or more input devices (e.g., a keyboard, joysticks and mouse) in the form of a standalone computing system, a desktop or a tablet, for example.

Upon completion of the target simulation by the LiDAR target simulator 214, optical signals are provided to optical transmitter lenses 220 (e.g., by optical fibers), which are contained in the optical front end 210, and transmitted to the LiDAR sensor 110 as the emulated echo signals. As will be appreciated, the light provided to the receiver of the LiDAR sensor 110 includes information of the simulated distance, or reflectivity, or shape, or a combination thereof for further analysis by the LiDAR sensor 110. In addition, the light provided to the receiver of the LiDAR sensor 110 further includes information of distortion from movement of the targets and/or the LiDAR sensor, according to representative embodiments herein.

LiDAR sensor return data gathered by the LiDAR sensor 110 are compared against the 3D simulation scene. Data from the LiDAR sensor 110 are delivered to the LiDAR sensor return data module 222 by means of the communication interface 224 for use in further testing of the LiDAR sensor 110. The 3D simulation scene is also delivered to the LiDAR sensor return data module 222 directly from the LiDAR target simulator 214. Notably, the LiDAR sensor return data module 222 includes a processor and a memory, which may be implemented as discussed above reference to the processor 217 and the memory 218. The memory stores instructions, which when executed by the processor compares received data to actual scenarios. In a representative embodiment, the LiDAR sensor return data module 222 receives the data packets returned from LiDAR sensor 110, and contains a simulated scenario in the form of data points measurement information such as shape of the target, distance of the target, target reflected intensity, measurement timestamp, horizontal and vertical angle of each measurement point/pixel, XYZ coordinates of each measurement point/pixel, and laser ID of each measurement. Measurement data packets are sent from the LiDAR sensor 110 to the LiDAR target simulator 214 via an ethernet or USB communication interface, for example.

Generally, light signal from the LiDAR sensor 110 is incident on the optical collection lenses 212 and is provided by optical fiber to the LiDAR target simulator 214, which includes a TOF optical delay line and an optical attenuator. The TOF optical delay line illustratively comprises series connected delay elements, parallel connected delay elements, or both. The TOF optical delay line is adapted to be dynamically variable, and as such is adapted to provide distance measurements of a simulated scene of varying magnitudes. The use of optical switches is contemplated to change the delay (and thus simulated distance) over time. Moreover, the control of the optical switches may be provided by the controller 216 described above. Specifically, the processor 217 is adapted to execute instructions provided in the memory 218 that change the configuration of the TOF optical delay line to emulate a desired distance to an emulated target.

The output of the TOF optical delay line is provided for transmission to an optical attenuator by optical fiber. The optical attenuator is configured to reduce the power (i.e., attenuate) of the light signal received from the optical fiber to emulate varying degrees of reflectivity of objects (including targets) in the path of the LiDAR sensor 110. By way of illustration, the optical attenuation may be performed using a known microelectromechanical system (MEMS) attenuator, such as a MEMs shutter-type attenuator. Alternatively, the optical attenuator may be a commercially available neutral-density filter. More generally, attenuation may be carried out through a change of alignment or distance between two fibers, or change of coupling between two fibers using adjustable mirror, etc.

Notably, the degree of attenuation may be controlled and varied dynamically like the TOF optical delay line to dynamically vary the attenuation of the light signal. Control of the optical attenuator may be provided by the controller 216 described above. Specifically, the processor 217 may be adapted to execute instructions provided in the memory 218 that change the configuration of the optical attenuator to emulate a desired reflectivity.

Additional description of LiDAR test systems is provided by U.S. patent application Ser. No. 17/126,085 to Chan Fong Tan et al., filed Dec. 18, 2020, which is hereby incorporated by reference in its entirety.

Figure 3:
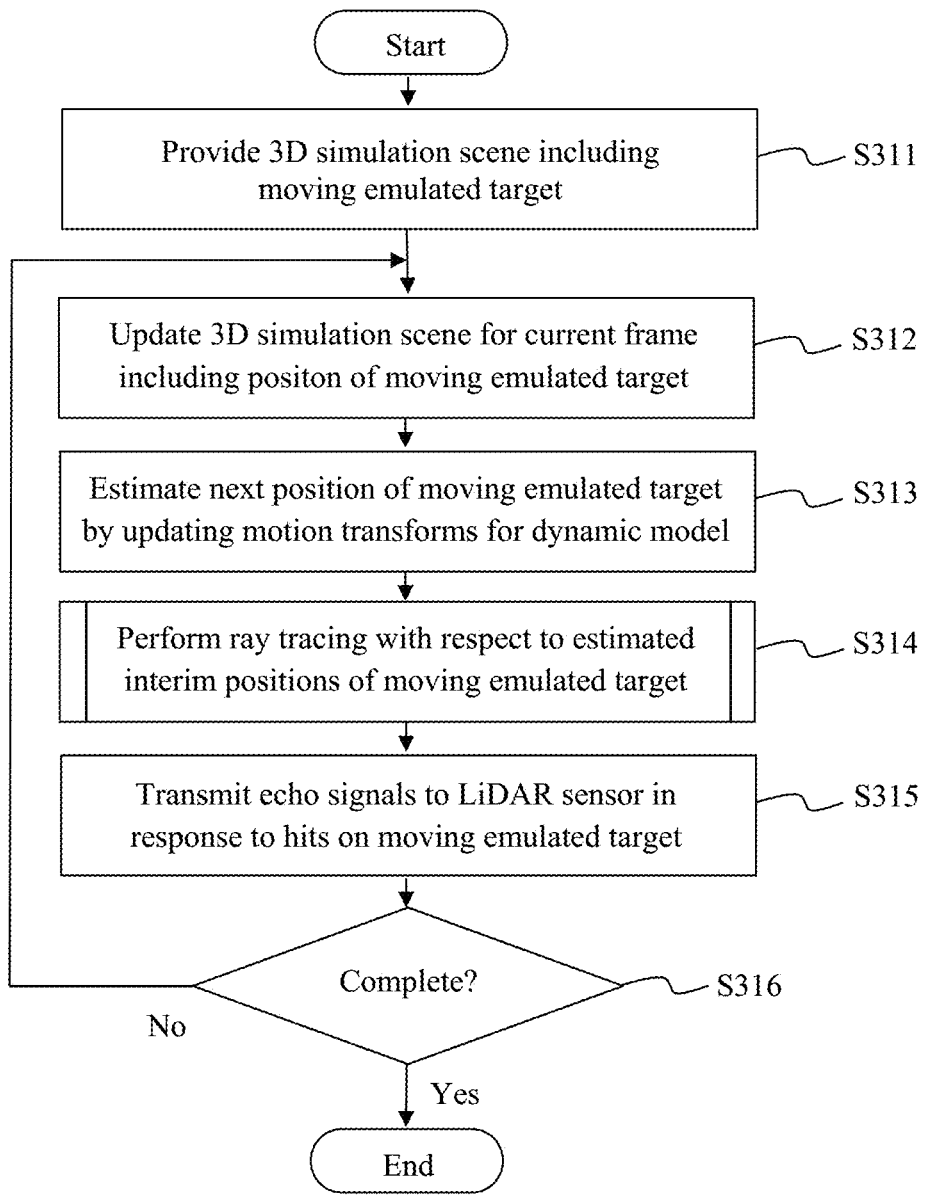
FIG. 3 is a simplified flow diagram showing a method for emulating echo signals reflected from diffuse targets and non-diffuse targets (if present), according to a representative embodiment.

FIG. 3 is a simplified flow diagram illustrating a method of emulating echo signals reflected from targets in response to a LiDAR signal transmitted by a LiDAR sensor on a vehicle under test, the emulated echo signals including distortion from movement of the targets and/or the LiDAR sensor, according to a representative embodiment. The method may be implemented on the system 200, discussed above, for example. The LiDAR sensor is assumed to be continuously transmitting LiDAR signals at a predetermined pulse rate throughout the loop indicated in FIG. 3.

Referring to FIG. 3, a 3D simulation scene is provided in block S311. For example, providing the 3D simulation scene may include loading the 3D simulation scene from the database 230 and building acceleration structures for dynamic and static models in the 3D simulation scene. For purposes of explanation, the 3D simulation scene includes at least one dynamic model of at least one moving emulated target (e.g., moving emulated target 105). The dynamic model includes data such as an initial position of the emulated target in 3D space, relative to the LiDAR sensor, as well as direction, velocity and acceleration information describing the motion of the emulated target. The position of the moving emulated target includes a current location in 3D space and orientation of the emulated moving target, which provides the distance and azimuth angle of the moving emulated target from the LiDAR sensor. For purposes of explanation, it is assumed that the 3D simulation scene provides for one emulated target having a constant velocity, such that the acceleration is zero. It is understood that the 3D simulation scene may include multiple moving emulated targets, all or some of which may have acceleration as well as velocity parameters, without departing from the scope of the present teachings. The 3D simulation scene may also include at least one static model of at least one stationary emulated target. However, the embodiments would not apply to the static models unless LiDAR sensor is moving, as discussed below. Acceleration structures are initially built from geometric data for the dynamic and static models. Generally, the dynamic and static models are 3D models (formed of many triangles or other primitives), and the acceleration structures are data structures to accelerate ray-primitive intersection computation.

In block S312, the 3D simulation scene is updated in accordance with the dynamic and static models. In particular, the 3D simulation scene is executed in frames that are updated at a predetermined frame rate, where new positions of the moving emulated target are consecutively determined based on the corresponding direction, velocity and acceleration information for that target. When the LiDAR sensor is also moving, the 3D simulation scene takes into account the position, direction, velocity and acceleration of the LiDAR sensor as well when updating each frame, including determining changes in the relative positions of the LiDAR sensor and each of the mobile and stationary emulated targets.

In block S313, a next position of the moving emulated target is estimated at the time of a next frame of the 3D simulation scene based on a current position of the moving emulated target at the time of a current frame. The next position is estimated by updating motion transforms for the dynamic model using multiple motion keys. The motion transforms are updated based on the current position of the moving emulated target determined in block S312 from the updated 3D simulation scene using at least two motion keys. In an embodiment, the multiple motion keys include a first motion key and a second motion key, where the first motion key is a first transformation matrix determined for the current frame at a first time instance ($t_i$) and the second motion key is a second transformation matrix for the next frame at a second time instance ($t_{i+1}$) occurring sequentially after the current frame, where the moving emulated target is in the current position at the first time instance $t_i$ and in the next position at the second time instance $t_{i+1}$. The next position is extrapolated from the current position using the first and second motion keys.

For example, the first transformation matrix (first motion key) of the moving emulated target may be indicated by $M_i$ at the first time instance $t_i$ of the current frame. The first transformation matrix $M_i$ is the product of a first translation transformation matrix $T_i$ and a first rotation transformation matrix $R_i$, where the first translation transformation matrix $T_i$ indicates changes in displacement and the first rotation transformation matrix $R_i$ indicates changes in orientation (angle) of the of the moving emulated target captured at the first time instance $t_i$. The first translation transformation matrix $T_i$ and the first rotation transformation matrix $R_i$ may be determined by comparing consecutive updates of the 3D simulation scene. The second transformation matrix (second motion key) similarly may be indicated by matrix $M_{i+1}$ at the second time instance $t_{i+1}$. The second transformation matrix $M_{i+1}$ is the product of a second translation transformation matrix $T_{i+1}$ and a second rotation transformation matrix $R_{i+1}$, where the second translation transformation matrix $T_{i+1}$ indicates estimated changes in displacement and the second rotation transformation matrix $R_{i+1}$ indicates estimated changes in orientation of the of the moving emulated target to be captured at the second time instance $t_{i+1}$ of the next frame.

In a representative embodiment, the second translation transformation matrix $T_{i+1}$ is determined according to Equation (1), the second rotation transformation matrix $R_{i+1}$ is determined according to Equation (2), and the second transformation matrix $M_{i+1}$ is determined according to Equation (3), below:

$$T_{i+1} = \begin{bmatrix} 1 & 0 & 0 & \Delta S_x \\ 0 & 1 & 0 & \Delta S_y \\ 0 & 0 & 1 & \Delta S_z \\ 0 & 0 & 0 & 1 \end{bmatrix} * T_i \quad \text{Equation (1)}$$

$$R_{i+1} = \begin{bmatrix} \cos\Delta\theta & 0 & \sin\Delta\theta & 0 \\ 0 & 1 & 0 & 0 \\ -\sin\Delta\theta & 0 & \cos\Delta\theta & 0 \\ 0 & 0 & 0 & 1 \end{bmatrix} * R_i \quad \text{Equation (2)}$$

$$M_{i+1} = T_{i+1} * R_{i+1} \quad \text{Equation (3)}$$

In Equation (1), $\Delta S$ is a displacement vector having the expression $\Delta S = \Delta t \cdot v_i$, where $\Delta t = t_{i+1} - t_i$ and $v_i$ is constant velocity of the moving emulated target. In Equation (2), $\Delta\theta$ is an orientation vector having the expression $\Delta\theta = \Delta t \cdot \omega_i$, where $\Delta t = t_{i+1} - t_i$ and $\omega_i$ is constant turning rate of the moving emulated target. In the depicted example, the second rotation transformation matrix $R_{i+1}$ is shown as rotating around a y-axis, for purposes of illustration. Of course, the second rotation transformation matrix $R_{i+1}$ may rotate around an x-axis or a z-axis, as respectively shown by Equations (4) and (5), below:

$$R_{i+1} = \begin{bmatrix} 1 & 0 & 0 & 0 \\ 0 & \cos\Delta\theta & -\sin\Delta\theta & 0 \\ 0 & \sin\Delta\theta & \cos\Delta\theta & 0 \\ 0 & 0 & 0 & 1 \end{bmatrix} * R_i \quad \text{Equation (4)}$$

$$R_{i+1} = \begin{bmatrix} \cos\Delta\theta & -\sin\Delta\theta & 0 & 0 \\ \sin\Delta\theta & \cos\Delta\theta & 0 & 0 \\ 0 & 0 & 1 & 0 \\ 0 & 0 & 0 & 1 \end{bmatrix} * R_i \quad \text{Equation (5)}$$

Other rotation matrices may be obtained from the matrices of Equations (2), (4) and (5) using matrix multiplication.

In block S314, ray tracing is performed with respect to estimated interim positions of the moving emulated target between the current position and the extrapolated next position of the moving emulated target. That is, the LiDAR sensor generates light (laser) pulses that are transmitted in different azimuth directions by a spinning mirror. Since the frame rate for updating the 3D simulation scene is less than the pulse rate of the LiDAR sensor, multiple light pulses will be emitted between the current and next positions of the moving emulated target. Accordingly, interim positions of the moving emulated target are interpolated between the current position and the next position corresponding to the timing of the light pulses. Ray tracing is performed to determine virtual intersections between rays corresponding to the light pulses and the interpolated interim positions of the moving emulated target, thereby identifying the locations of the moving emulated target from which emulated echo signals are reflected.

Ray tracing is described with reference to FIG. 4, which is a simplified flow diagram illustrating a method of performing ray tracing for light pulses of a LiDAR signal, according to a representative embodiment. Generally, ray tracing is a rendering technique in which paths of light (ray tracing pipelines) are traced from a light source toward one or more virtual objects, such as the moving emulated target, to simulate effects of the light paths when they encounter the virtual objects. Ray tracing may be performed using standard ray tracing APIs executable by a GPU, where aspects of the ray tracing are adjusted for purposes of the method below. The method for performing the ray tracing may be implemented on the system 200, discussed above, for example.

Figure 4:
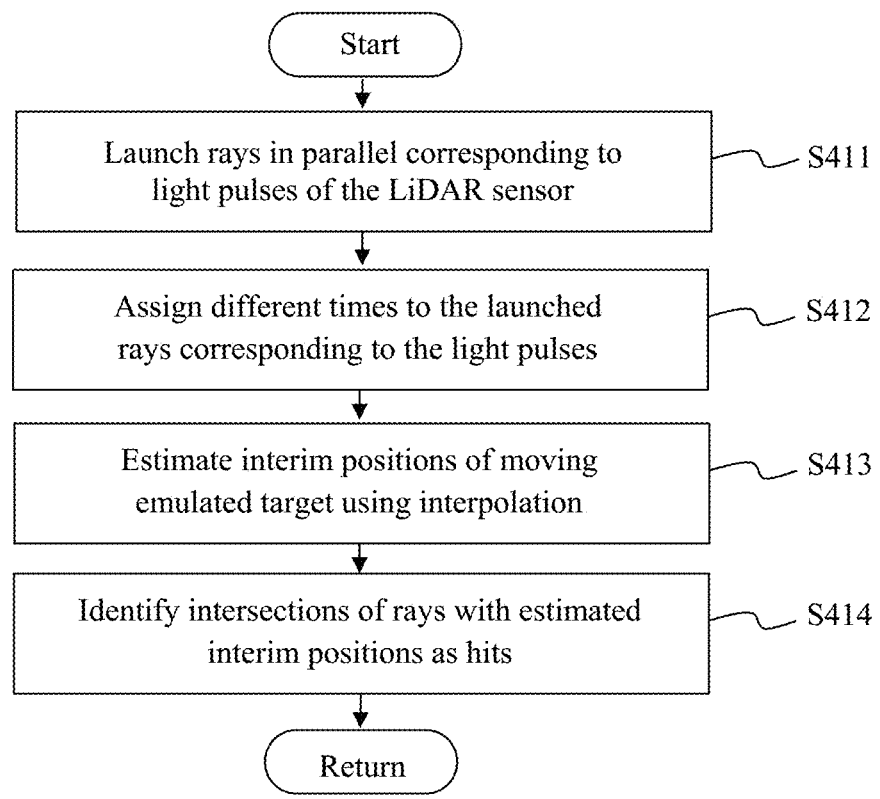
FIG. 4 is a simplified flow diagram showing a method of performing ray tracing for light pulses of a LiDAR signal, according to a representative embodiment.

Referring to FIG. 4, the ray tracing includes launching rays in parallel (simultaneously) in block S411, which is standard for ray tracing APIs. The rays correspond to the light pulses emitted by the LiDAR signal, and the number of rays launched in parallel is the same as the number of light pulses emitted by the LiDAR sensors during a given time period, such as the period of the frames in the 3D simulation scene. In block S412, different time values are assigned to the rays to simulate the timing of the corresponding light pulses of the LiDAR signal. For example, a first ray corresponding to a first light pulse is assigned pulse time $t_p$, a second ray corresponding to a second light pulse is assigned pulse time $t_{p+1}$, a third ray corresponding to a third light pulse is assigned pulse time $t_{p+2}$, and so on.

In block S413, interim positions (locations and orientations) of the moving emulated target at the different time values are estimated using interpolation. For example, it may be assumed that the pulse time $t_p$ of the first light pulse corresponds to the first time instance $t_i$ of the current frame of the 3D simulation scene (e.g., as shown in FIGS. 1A and 1B), in which case the interim position of the moving emulated target at the pulse time $t_p$ is the same as the current position of the moving emulated target. In this case, the interim position of the moving emulated target at the pulse time $t_{p+1}$ of the second light pulse may be interpolated between the current position and the extrapolated next position of the moving emulated target at the first and second time instances $t_i$ and $t_{i+1}$, respectively, based on the relative time differences between the pulse time $t_{p+1}$, and each of the first time instance $t_i$ and the second time instance $t_{i+1}$. Likewise, the interim position of the moving emulated target at the pulse time $t_{p+2}$ of the third light pulse may be interpolated between the current position and the extrapolated next position of the moving emulated target, based on the relative time differences between the pulse time $t_{p+2}$ and each of the first time instance $t_i$ and the second time instance $t_{i+1}$. This process is repeated to determine interim positions of the moving emulated target for each of the light pulses occurring between the first and second time instances $t_i$ and $t_{i+1}$.

In block S414, intersections of the rays with the estimated interim positions of the moving emulated target are identified as positions of hits of the rays. The intersections are identified by comparing the paths of the rays with the geometric data of the dynamic model. The identified intersections are returned to the process in FIG. 3.

The ray tracing uses an API of a GPU, which is a standardized software interface running on one or more platforms, operating systems and hardware, for achieving optimal ray tracing performance. Examples of the API include Nvidia OptiX™, Vulkan, DirectX Raytracing, although different APIs may be incorporated without departing from the scope of the present teachings. The ray tracing API includes at least functionality for acceleration structure (AS) building and management, and support for ray tracing pipelines and shaders. An acceleration structure is a data structure built from geometric data over the scene information from the 3D simulation scene to optimize the search for the intersection of rays with the geometric data corresponding to objects in the 3D simulation scene. There are typically two types of acceleration structures: geometry primitives (geometry AS) and instances (instance AS), which also may be referred to as bottom-level AS and top-level AS, respectively. Shaders are parts of the ray tracing pipelines that may be user controlled. Each shader indicates instructions for a subset of the more complex ray tracing pipeline.

Figure 5:
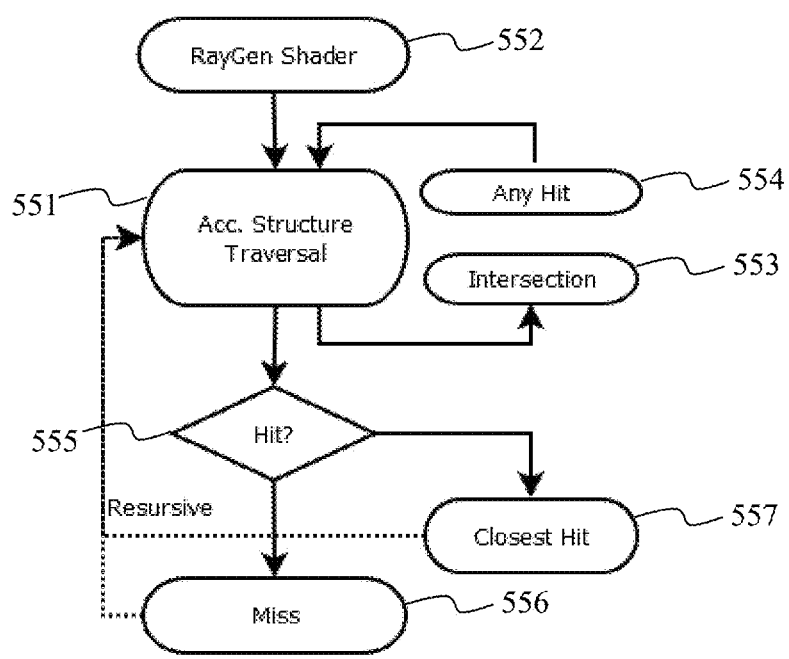
FIG. 5 is a simplified block diagram showing general functionality of a ray tracing pipeline used to perform ray tracing for light pulses of a LiDAR signal, according to a representative embodiment.

FIG. 5 is a simplified block diagram showing general functionality of a ray tracing pipeline used to perform ray tracing for light pulses of a LiDAR signal, according to a representative embodiment.

Referring to FIG. 5, ray tracing pipeline 550 includes multiple shaders for generating and tracking rays corresponding to the light pulses of the LiDAR sensor, and determining whether hits occur for the rays (intersections between the rays and the moving emulated target at different positions). The shaders are invoked by according to an acceleration structure traversal 551 configured to traverse the 3D simulation scene in traversal loops to determine the acceleration structures, including the dynamic model of the moving emulated target in its various positions, with which the rays intersect using the geometric data, as described above with reference to block S414. As traversal progresses, when a ray intersects the moving emulated target, associated shaders are automatically executed by the implementation.

A ray generation shader 552 is the starting point for tracing rays into the 3D simulation scene. The ray generation shader 552 runs on a 2D grid of threads, and is also responsible for writing final output data to memory. The ray generation shader 552 controls the location at which the rays start, where the location corresponds to the position of the LiDAR sensor in the 3D simulation scene. The ray generation shader 552 also is used to assign a relative time value to each ray to correspond to a pulse time of one of the light pulses. The time value is stored in a ray payload structure for communicating among the different shader stages shown in FIG. 5. The time value is used to interpolate the position of the moving emulated target at the instant the light pulse is emitted, as discussed above.

An intersection shader 553 implements arbitrary ray-primitive intersection algorithms, controlling when the rays intersect the geometric data of the moving emulated target. An any hit shader 554 is invoked on any intersection of a ray with scene primitive, while a closest-hit shader 557 is invoked on the closest intersection point along the ray. The any hit shader 554 may also control transparency behavior regarding the geometric data. That is, when the material of the moving emulated target is not opaque, it is possible to let the ray pass through and proceed to the next traversal loop. In each traversal loop, it is determined at block 555 whether the ray generated in that loop hits or misses the geometric data defining the moving emulated target. A miss shader 556 controls the response when the ray misses the geometric data (no intersection).

In this context, a user-defined data structure ray-payload is passed among different the shader stages shown in FIG. 5 to communicate information. For the moving emulated target, the bounding volume hierarchy in the acceleration structure must enclose the sweep of the objects through the time range of LiDAR pulses. When the ray tracing API does not support motion blur, custom intersection shaders that accept time as a parameter must be added as the intersection shader 553. The time parameter is used to interpolate the interim positions of the moving emulated target between the first and second motion keys. When the ray tracing API already supports motion blur, the time value is passed as a raytime parameter.

Referring again to FIG. 3, echo signals are transmitted back to the LiDAR sensor in block S315 as responses to the light pulses of the LiDAR signal being reflected from the moving emulated target at the intersections between of the rays and the estimated interim positions of the moving emulated target. As discussed above, the echo signals may be the light pulses delayed in time, e.g., by an optical delay line through control of various delay elements, to emulate distances to the emulated moving target at the interpolated interim positions. The echo signals include emulated velocity-dependent distortions from the motion of the moving emulated target indicated by the ray tracing. The distortions may be added to the transmission of the echo signals by assigning hit positions to last reference frame of the LiDAR signal (final position of the LiDAR sensor in one scan).

In block S316, it is determined whether the LiDAR sensor testing is complete. When the LiDAR sensor testing is not complete (block S316: no), the process returns to block S312, where 3D simulation scene is updated for the next frame, which is now considered the current frame (corresponding to the extrapolated next frame at the second time instance $t_{i+1}$ in the previous loop). The position of the moving emulated target is determined (updated) as the current position for the present loop using the 3D simulation scene itself, e.g., including drive scenario logic for an autonomous driver in the 3D simulation scene, for example. The extrapolated position from the previous loop may be discarded. The process then repeats in order to provide emulated echo signals from the moving emulated target in estimated positions corresponding to the light pulses of the LiDAR signal, as discussed above. When the LiDAR sensor testing is complete (block S316: yes), the process ends. In this way, the process is continual throughout the LiDAR sensor testing while the LiDAR sensor is transmitting the LiDAR signal. So, the LiDAR sensor continually receives emulated echo signals from the moving emulated target at the different positions. For purposes of illustration, the process depicted in FIG. 3 assumes one target, although substantially the same process executed in parallel would apply to multiple targets, without departing from the scope of the present teachings.

In the description above, it is assumed that the LiDAR sensor is stationary for ease of illustration. When the LiDAR sensor is moving, future positions of the LiDAR sensor for each frame of the simulation scene may be extrapolated, future positions of the LiDAR sensor for the pulse times corresponding to light pulses of the LiDAR signal may be interpolated, and intersections of the ray tracing with moving emulated targets, as well as stationary emulated targets, may be determined in the same manner discussed above with reference to FIGS. 3 to 5. That is, in general, the 3D simulation scene and the acceleration structure being built would include the LiDAR sensor, and the 3D simulation scene would include at least one dynamic model of the LiDAR sensor. The current position of the LiDAR sensor is indicated by a current frame at a first time instance of the 3D simulation scene, and a next position of the LiDAR sensor for a next frame at a second time instance in the future is extrapolated from the current position using motion transforms. Once the current and extrapolated next position are determined, interim positions of the LiDAR sensor at pulse times corresponding to the pulse rate of the LiDAR are interpolated between the current position at the first time instance and the extrapolated next position at the next time instance using a ray tracing API executed by a GPU, for example. Intersections of the light pulses of the LiDAR signal and the moving emulated target are estimated at the interim positions of the LiDAR sensor. Echo signals responsive to the transmitted LiDAR signals reflected from one or more stationary and moving emulated targets are transmitted to LiDAR sensor in its interpolated interim positions relative to these emulated targets. The echo signals simulate relative distances between the moving emulated target and the moving LiDAR sensor at each of the intersections, and are transmitted to the LiDAR sensor via an optical transmitter lens, for example.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of emulating echo signals reflected from targets in response to a LiDAR signal transmitted by a LiDAR sensor on a vehicle under test, the emulated echo signals including distortion from movement of the targets and/or the LiDAR sensor, the method comprising:
   updating a current position of at least one moving emulated target according to a 3D simulation scene at a current frame, the 3D simulation scene comprising at least one dynamic model of the at least one moving emulated target;
   estimating a next position of the at least one moving emulated target at a next frame of the 3D simulation scene by updating motion transforms for the at least one dynamic model using a plurality of motion keys;
   performing ray tracing comprising launching rays in parallel, assigning different pulse times to the rays to respectively simulate timing of corresponding light pulses of the LiDAR signal, estimating interim positions of the at least one moving emulated target at the different pulse times using interpolation, and identifying intersections of the rays with the at least one moving emulated target at the estimated interim positions as positions of hits of the rays;
   transmitting emulated echo signals to the LiDAR sensor indicating the positions of the hits; and
   updating the 3D simulation scene at the next frame to update a new current position of the at least one moving emulated target.

2. The method of claim 1, wherein estimating the next position of the at least one moving emulated target comprises extrapolating the next position of the at least one moving emulated target at the next frame by updating motion transforms for the at least one dynamic model at the current position of the of the at least one moving emulated target using a plurality of motion keys.

3. The method of claim 2, wherein the plurality of motion keys comprise a first motion key and a second motion key corresponding to the at least one moving emulated target,
   wherein the first motion key for the at least one moving emulated target comprises a transformation matrix at a current frame of the 3D simulation scene at a first time instance ($t_i$) determined after updating the 3D simulation scene,
   wherein the second motion key for the at least one moving emulated target comprises the first motion key extrapolated to a sequential second time instance ($t_{i+1}$) of a next frame of the 3D simulation scene after the current frame, and
   wherein estimating the interim positions of the at least one moving emulated target comprises interpolating an interim position of the at least one moving emulated target between the current position at the first time instance ($t_i$) and the estimated next position at the second time instance ($t_{i+1}$) for a pulse time ($t_p$) corresponding to the interim position of the different pulse times assigned to the rays, wherein the pulse time ($t_p$) is between the first time instance ($t_i$) and the second time instance ($t_{i+1}$).

4. The method of claim 3, wherein when the transformation matrix of the at least one moving emulated target is M, the first motion key is $M_i$ at the first time instance ($t_i$) of the current frame, and the second motion key is $M_{i+1}$ at the second time instance ($t_{i+1}$), and wherein $M_{i+1} = T_{i+1} * R_{i+1}$, where T is a translation transformation matrix and R is a rotation transformation matrix.

5. The method of claim 4, wherein, when $T_i$ is the translation transformation matrix and $R_i$ is the rotation transformation matrix at the first time instance ($t_i$), and when a velocity ($v_i$) and a turning rate ($\omega_i$) are constant at the first time instance ($t_i$), it follows:

$$\Delta t = t_{i+1} - t_i$$

$$\Delta S = \Delta t * v_i$$

$$\Delta \theta = \Delta t * w_i$$

$$T_{i+1} = \begin{bmatrix} 1 & 0 & 0 & \Delta S_x \\ 0 & 1 & 0 & \Delta S_y \\ 0 & 0 & 1 & \Delta S_z \\ 0 & 0 & 0 & 1 \end{bmatrix} * T_i$$

$$R_{i+1} = \begin{bmatrix} \cos\Delta\theta & 0 & \sin\Delta\theta & 0 \\ 0 & 1 & 0 & 0 \\ -\sin\Delta\theta & 0 & \cos\Delta\theta & 0 \\ 0 & 0 & 0 & 1 \end{bmatrix} * R_i$$

$$M_{i+1} = T_{i+1} * R_{i+1}$$

wherein $\Delta S$ and $\Delta \theta$ are displacement and orientation vector changes respectively, and the rotation transformation matrix $R_i$ is shown as rotating around a y-axis.

6. The method of claim 3, further comprising:
   updating a position of the LiDAR sensor based on movement of the LiDAR sensor using a plurality of LiDAR motion keys.

7. The method of claim 1, wherein performing the ray tracing further comprises:

building and managing acceleration structures to optimize searching for the intersections of the rays with geometric data of the acceleration structures, wherein the acceleration structures comprise geometry primitives and geometry instances;

associating ray tracing shaders to ray tracing pipelines corresponding to the rays, respectively;

determining when the hits occur corresponding to the intersections of the rays with the geometric data in the ray tracing pipelines, respectively; and automatically executing the associated ray tracing shaders according to stages of the ray tracing pipelines, respectively.

8. The method of claim 7, further comprising:
updating the acceleration structures for the at least one dynamic model.

9. A system for emulating echo signals reflected from targets in response to a LiDAR signal transmitted by a LiDAR sensor on a vehicle under test, the emulated echo signals including distortion from movement of the targets and/or the LiDAR sensor, the system comprising:

an optical front end comprising an optical collection lens configured to receive the LiDAR signal transmitted by the LiDAR sensor and an optical transmitter lens configured to transmit emulated echo signals in response to the LiDAR signal reflecting from a moving emulated target;

a LiDAR target simulator configured to simulate at least distance of the moving emulated target from the LiDAR sensor; and a processor and a non-transitory memory for storing instructions that, when executed by the processor, cause the processor to:

update a current position of the moving emulated target according to a 3D simulation scene at a current frame, the 3D simulation scene comprising a dynamic model of the moving emulated target;

extrapolate a next position of the moving emulated target at a next frame of the 3D simulation scene from the current position;

interpolate interim positions of the moving emulated target between the current position and the extrapolated next position at times corresponding to light pulses of the LiDAR signal; and estimate intersections of the light pulses of the LiDAR signal and the moving emulated target at the interpolated interim positions, wherein the LiDAR target simulator provides echo signals simulating distances of the moving emulated target at each of the estimated intersections, which are transmitted to the LiDAR sensor via the optical transmitter lens.

10. The system of claim 9, wherein extrapolating the next position of the moving emulated target comprises updating motion transforms at the current position of a dynamic model the moving emulated target using motion keys.

11. The system of claim 10, wherein the motion keys comprise a first motion key and a second motion key corresponding to the moving emulated target, wherein the first motion key comprises a transformation matrix at the current frame of the 3D simulation scene at a first time instance ($t_i$) determined after updating the 3D simulation scene, wherein the second motion key comprises the first motion key extrapolated to a sequential second time instance ($t_{i+1}$) of the next frame of the 3D simulation scene, and wherein when the transformation matrix of the moving emulated target is M, the first motion key is $M_i$ at the first time instance ($t_i$) of the current frame, and the second motion key is $M_{i+1}$ at the second time instance ($t_{i+1}$), and wherein $M_{i+1}=T_{i+1}*R_{i+1}$, where T is a translation transformation matrix and R is a rotation transformation matrix.

12. The system of claim 9, wherein the instructions further cause the processor to:
perform ray tracing by launching rays corresponding to the light pulses in parallel; and
assign different pulse times to the rays to respectively simulate the times corresponding to the light pulses of the LiDAR signal,
wherein the interim positions of the moving emulated target are interpolated at the different pulse times.

13. The system of claim 9, wherein instructions further cause the processor to:
update a current position of the LiDAR sensor according to the 3D simulation scene at the current frame, the 3D simulation scene comprising at least one dynamic model of the LiDAR sensor;
extrapolate a next position of the LiDAR sensor at the next frame of the 3D simulation scene from the current position;
interpolate interim positions of the LiDAR sensor between the current position and the extrapolated next position at the times corresponding to the light pulses of the LiDAR signal; and
estimate intersections of the light pulses of the LiDAR signal and the moving emulated target at the interpolated interim positions of the LiDAR sensor.

14. The system of claim 13, wherein the LiDAR target simulator provides echo signals simulating relative distances between the moving emulated target and the LiDAR sensor at each of the estimated intersections, which are transmitted to the LiDAR sensor via the optical transmitter lens.

15. A non-transitory computer readable medium storing instructions for emulating echo signals reflected from targets in response to a LiDAR signal transmitted by a LiDAR sensor on a vehicle under test, the emulated echo signals including distortion from movement of the targets and/or the LiDAR sensor, wherein when executed by at least one processor, the instructions causing the at least one processor to:

update a current position of at least one moving emulated target according to a 3D simulation scene at a current frame, the 3D simulation scene comprising at least one dynamic model of the at least one moving emulated target;

estimate a next position of the at least one moving emulated target at a next frame of the 3D simulation scene by updating motion transforms for the at least one dynamic model using a plurality of motion keys;

perform ray tracing including launching rays in parallel, assigning different pulse times to the rays to respectively simulate timing of corresponding light pulses of the LiDAR signal, estimating interim positions of the at least one moving emulated target at the different pulse times using interpolation, and identifying intersections of the rays with the at least one moving emulated target at the estimated interim positions as positions of hits of the rays;

cause transmission of emulated echo signals to the LiDAR sensor indicating the positions of the hits; and update the 3D simulation scene at the next frame to update a new current position of the at least one moving emulated target.

16. The non-transitory computer readable medium of claim 15, wherein the instructions cause the at least one processor to estimate the next position of the at least one moving emulated target by extrapolating the next position of the at least one moving emulated target at the next frame by updating motion transforms for the at least one dynamic model at the current position of the of the at least one moving emulated target using a plurality of motion keys.

17. The non-transitory computer readable medium of claim 16, wherein the plurality of motion keys comprise a first motion key and a second motion key corresponding to the at least one moving emulated target,
- wherein the first motion key for the at least one moving emulated target comprises a transformation matrix at a current frame of the 3D simulation scene at a first time instance ($t_i$) determined after updating the 3D simulation scene,
- wherein the second motion key for the at least one moving emulated target comprises the first motion key extrapolated to a sequential second time instance ($t_{i+1}$) of a next frame of the 3D simulation scene after the current frame, and
- wherein estimating the interim positions of the at least one moving emulated target comprises interpolating an interim position of the at least one moving emulated target between the current position at the first time instance ($t_i$) and the estimated next position at the second time instance ($t_{i+1}$) for a pulse time ($t_p$) corresponding to the interim position of the different pulse times assigned to the rays, wherein the pulse time ($t_p$) is between the first time instance ($t_i$) and the second time instance ($t_{i+1}$).

18. The non-transitory computer readable medium of claim 17, wherein when the transformation matrix of the at least one moving emulated target is M, the first motion key is $M_i$ at the first time instance ($t_i$) of the current frame, and the second motion key is $M_{i+1}$ at the second time instance ($t_{i+1}$), and wherein $M_{i+1}=T_{i+1}*R_{i+1}$, where T is a translation transformation matrix and R is a rotation transformation matrix.

19. The non-transitory computer readable medium of claim 18, wherein the instructions further cause the at least one processor to:
- update a position of the LiDAR sensor based on movement of the LiDAR sensor using a plurality of LiDAR motion keys.

20. The non-transitory computer readable medium of claim 15, wherein the instructions cause the at least one processor to perform the ray tracing by further:
- building and managing acceleration structures to optimize searching for the intersections of the rays with geometric data of the acceleration structures, wherein the acceleration structures comprise geometry primitives and geometry instances;
- associating ray tracing shaders to ray tracing pipelines corresponding to the rays, respectively;
- determining when the hits occur corresponding to the intersections of the rays with the geometric data in the ray tracing pipelines, respectively; and
- automatically executing the associated ray tracing shaders according to stages of the ray tracing pipelines, respectively.

\* \* \* \* \*